United States Patent [19]
Williamson et al.

[11] Patent Number: 6,081,546
[45] Date of Patent: Jun. 27, 2000

[54] TELEPHONE LINE SEIZURE CIRCUIT

[75] Inventors: William Williamson, Hudson, Wis.;
Wen Ping Wang, Minneapolis, Minn.

[73] Assignee: Birch Bridge Communications Corp.,
St. Paul, Minn.

[21] Appl. No.: 09/001,860

[22] Filed: Dec. 31, 1997

[51] Int. Cl.$^7$ .............................. H04M 1/24; H04M 3/08; H04M 3/22; H04M 11/04

[52] U.S. Cl. ................................. 375/33; 379/40; 379/51; 379/195

[58] Field of Search .................................. 375/33, 39, 40, 375/45, 51, 41, 150, 155, 168, 184

[56] References Cited

U.S. PATENT DOCUMENTS

| | | | |
|---|---|---|---|
| 4,390,750 | 6/1983 | Bartelink | 379/33 |
| 5,465,297 | 11/1995 | Azem | 379/40 |
| 5,799,062 | 8/1998 | Lazzara et al. | 379/51 |
| 5,877,683 | 3/1999 | Sheasley | 379/39 |

*Primary Examiner*—Paul Loomis
*Attorney, Agent, or Firm*—Stoel Rives LLP

[57] ABSTRACT

A telephone system including circuitry for monitoring the "on hook" and "off hook" conditions of telephone handsets coupled to a system controller and disconnecting all off hook handsets from the telephone line. With the detection of an alarm condition at a security alarm system that requires a communication link, line seizure is effected via an SCR controlled seizure circuit serially connected between each distributed handset and the telephone line. The seizure circuit normally conducts when a connected telephone is off hook. Upon detecting an alarm, a line monitor momentarily shorts the telephone line to drive any conducting line seizure circuits into a non-conducting condition that is maintained sufficiently long to permit the system controller to gain control of the line. During controller communications, the handsets are also isolated from the telephone line. A local phone is also coupled to permit reprogramming if an inoperative line is detected. A speech interface facilitates system programming via a central station.

20 Claims, 3 Drawing Sheets

TELEPHONE LINE SEIZURE CIRCUIT

BACKGROUND OF THE INVENTION

The present invention relates to security alarm systems and, in particular, to a telephone line seizure circuit which is attachable to each distributed telephone and or telephone jack at a monitored premises and which will seize or disconnect any "off hook" telephones. The system controller is thereby able to obtain control of the telephone line and initiate an appropriate response in the event of the necessity to report an alarm condition.

Most reporting alarm systems in use today use a switched telephone network to report alarm conditions. A requirement of such systems is that the alarm system have priority over all telephone line use during alarm reports. This need arises because of the possibility of personnel at a premises using a shared telephone line during an alarm or the possibility of picking up a premise telephone, as alarm communications are occurring and disrupting the alarm call.

The problem is corrected in most alarm systems, during system installation, by rewiring the incoming telephone line and premise telephones directly to the alarm system controller panel at the premises. Each line is connected to a line seizure relay at the panel. The telephone lines to each of the distributed telephones must therefore be routed a number of available, normally closed contacts (i.e. "swingers") at the line seizure relay.

With the activation of the line seizure relay during an alarm report, each premises telephone connected to the relay is disconnected and the telephone line is connected to the alarm communication circuitry of the system controller. The system controller then has unobstructed control over the telephone line. One or more of such relays can be provided at the system controller panel. Systems of the foregoing type are shown at U.S. Pat. Nos. 4,444,999; 4,805,210 and 4,807,278.

Another telephone line seizure scheme is shown it U.S. Pat. No. 5,465,297 and wherein an automatic telephone dialer at the alarm system controls a number of line seizure circuits distributed about the premises. Each line seizure circuit is coupled in parallel between each distributed telephone and a supporting jack. With an automatic dialer going off hook, each seizure circuit connected to the telephone line is initiated to provide a 30 second period during which parties on the off hook line can disconnect before an automatic disconnect is enabled by the automatic dialer. The automatic dialer is then able to re-connect to the freed lines and obtain control. Proper system operation requires that all telephones connected to each line include a seizure circuit.

Although the foregoing circuits free the telephone line for system access, proper installation typically requires a professional alarm system installer to make the appropriate connections. That is, a technically conversant installer must visit the premises as each telephone is added to assure proper system operation. Installer visits, however, are costly and not desired by many system owners, especially home owners with "do it yourself" alarm systems. The circuitry of the present invention was therefore developed to accommodate installation by non-technical personnel, such as the average homeowner, and yet assure proper system operation. Proper operation is assured by merely inserting a seizure circuit or "blocker", which is constructed in modular form, in series between the wall jack and each telephone, modem or other communications device coupled to the telephone line and not directly connected lo the system controller panel of the alarm system. The seizure circuits can be mounted to the front or back of each jack.

The system controller panel of the invention, in turn, includes telephone line status detection and signaling circuitry which controls the line seizure circuits to open and disable any off hook devices connected to the telephone line and permit the controller to effect an alarm report.

SUMMARY OF THE INVENTION

It is accordingly a primary object of the invention to provide a security alarm system having an ability to clear a telephone line of all off hook telephones when the system needs to communicate.

It is a further object of the invention to provide a microprocessor controlled system wherein a telephone line monitor monitors the "on" and "off" hook conditions of the telephones coupled to the system.

It is a further object of the invention to provide a system wherein the line monitor transmits a pulsed line polling signal and monitors a transmission delay to determine telephone line conditions.

It is a further object of the invention to provide a system wherein the system controller, upon detecting an alarm condition, responds to the line monitor to disrupt current to off hook phones sufficiently long allow the system controller to capture the telephone line.

It is a further object of the invention to provide a system wherein a series connected line seizure or "blocker" circuit at each premises telephone is normally shorted during use and which can be selectively opened and disabled by the system controller upon detecting alarm events.

It is a further object of the invention to provide SCR controlled line seizure circuits that are disabled by the system controller selectively coupling a capacitor across the telephone line.

It is a further object of the invention to provide a system that permits local programming of the system controller with premise telephones, even if the phone line is inoperative.

It is a further object of the invention to alert the user to an inoperative line condition.

It is a further object of the invention to provide a system that can be interactively programmed from a remote telephone over a voice synthesis interface with the central station.

Various of the foregoing objects, advantages and distinctions of the invention are obtained in a presently preferred alarm system wherein each premise telephone includes a series connected line seizure circuit. A telephone line monitor at the system controller in the event of an alarm selectively couples a capacitor across the telephone line to disable each off hook telephone and reconnect the system controller to the freed line. The distributed telephones are also isolated from the line during use by the system controller. If the line monitor determines the telephone line is disabled or inoperative, the controller alerts the system owner and couples a premise telephone to the controller to permit re-programming of the panel.

Still other objects, advantages and distinctions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
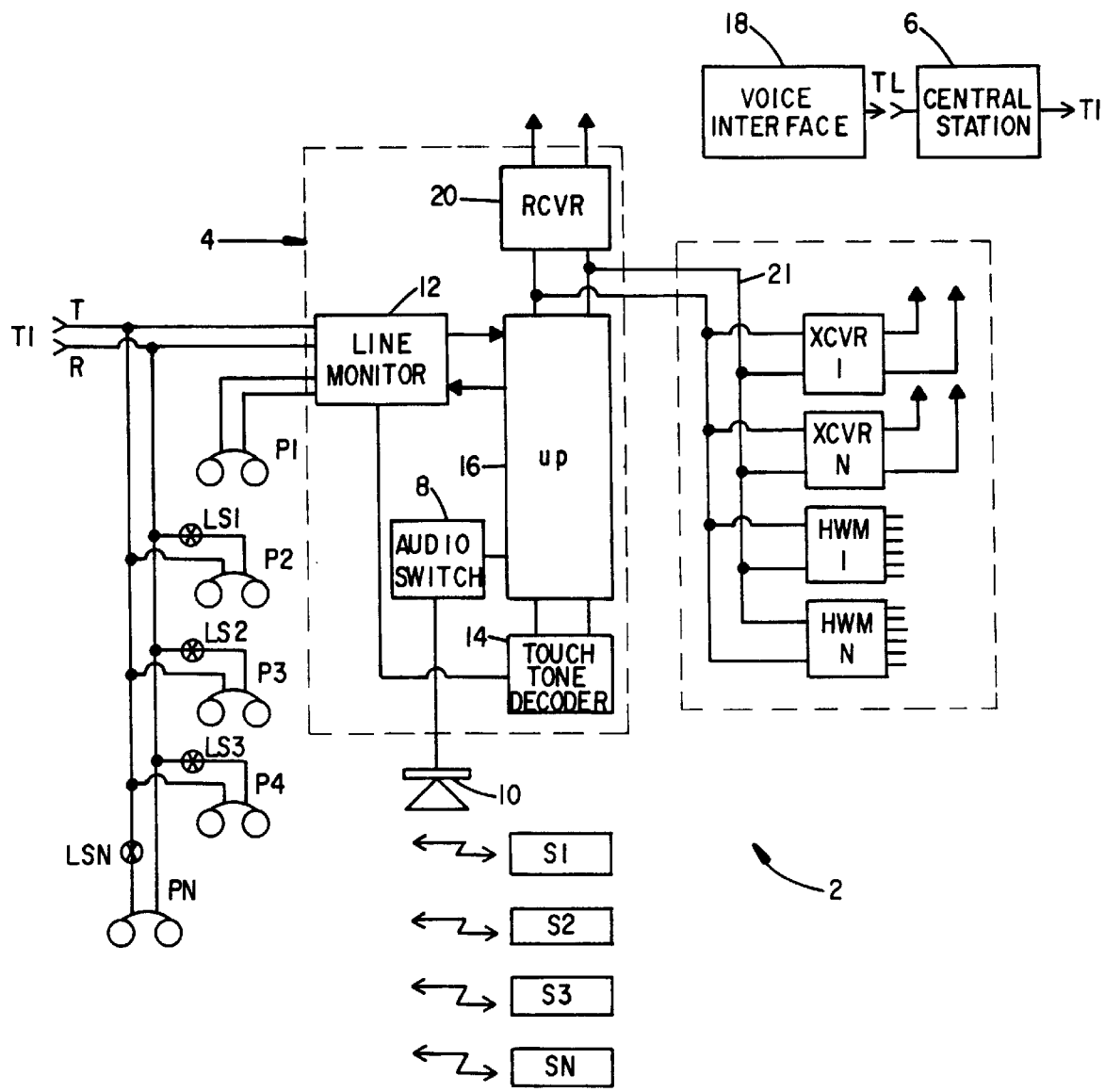
FIG. 1 is a block diagram of a typical security alarm system including the telephone line seizure circuitry of the invention.

Referring to FIG. 1, a system block diagram is shown to a security alarm system 2 which includes the invention and as it is typically configured at a monitored premises. The system 2 includes a system controller or alarm panel 4 that communicates with a central monitoring station 6 over a telephone link that may include one or more telephone lines. A single telephone line T1 is shown and to which a number of distributed telephones P1 to P"N" are connected at the premises The telephone physically closest to the system controller panel 4 (e.g. P1) is connected through inputs T' and R', reference FIG. 2, and which connection couples the phone P1 to the telephone line T1 in certain emergencies. That is, the panel 4 includes a relay K3 which connects P1 to the alarm panel in a dedicated fashion if the telephone line T1 is non-operational. The details of the latter function are described more fully below with respect to FIG. 2. The rest of the premise telephones P2 to PN include separate line seizure circuits LS1-LS"N" that are connected in series to either of the two wires at the telephone line T1. The circuits LS1-LS"N" may be mounted behind a conventional wall jack or may be plugged into the front of the jack, before attaching a lead to an associated telephone handset.

The system owner and or central station personnel normally communicate with the system controller 4 via the telephone line T1. Conventional activities over the telephone line T1 include, among others, programming the controller 4 with touch-tone commands to conversing directly with personnel at the premises via an audio switch 8 and an on-site speaker 10. Telephone line traffic is channeled through the telephone line monitor 12 and touch-tone decoder circuitry 14. Necessary control signals are developed at a microprocessor 16 and or are stored in associated RAM and ROM memory (not shown). The decoder 14 is able to detect both dial tone and TT signals and the signals, are detected regardless of the on hook and off hook condition of the panel 4.

Also provided at the system 2 is a speech interface 18 that is accessible from any telephone line TL and whereby the installer or system owner with voiced commands can scroll and interact with an available menu to program and re-program the operation of the system controller 4. The menu, commands and programming are effected under the control of the central station 6 or any other operational site including an interface 18. In normal circumstances, the installer programs the microprocessor 16 via the telephone line T1 and one of various telephones P1 to PN distributed about the premises. Later changes can be made via the interface 18. As will be discussed below and with an inoperative telephone line T1, the system owner or installer may also program the system controller 4 directly from the telephone P1.

Distributed about the premises and coupled to the system controller 4 over a hardwired bus 21 are a number of wireless sensors S1 to S"N". The sensors typically monitor doors, windows, motion, PIR, and floor mats, among others, and each of which communicate via an associated RF transmitter (not shown) to a panel receiver 20. Hardwired sensors of various conventional types may also be connected directly to the controller 4 or via hardwire modules HWM1 to HWM"N" and each of which modules accommodate a number of hardwired sensors. The system controller 4 may also be coupled to one or more long range transmitters or transceivers XCVR1 to XCVR"N". The latter transmitters and transceivers permit wireless communications to sensors which are positioned beyond the normal operating range of the system controller 4. They also permit transmission of control signals to the system or other systems through so called "X10" type modules, that is wireless switch interfaces or drivers which, for example, control lights or other electrical devices at the premises, control temperature and or monitor of perform sundry other control functions external to the system controller 4.

Figure 2:
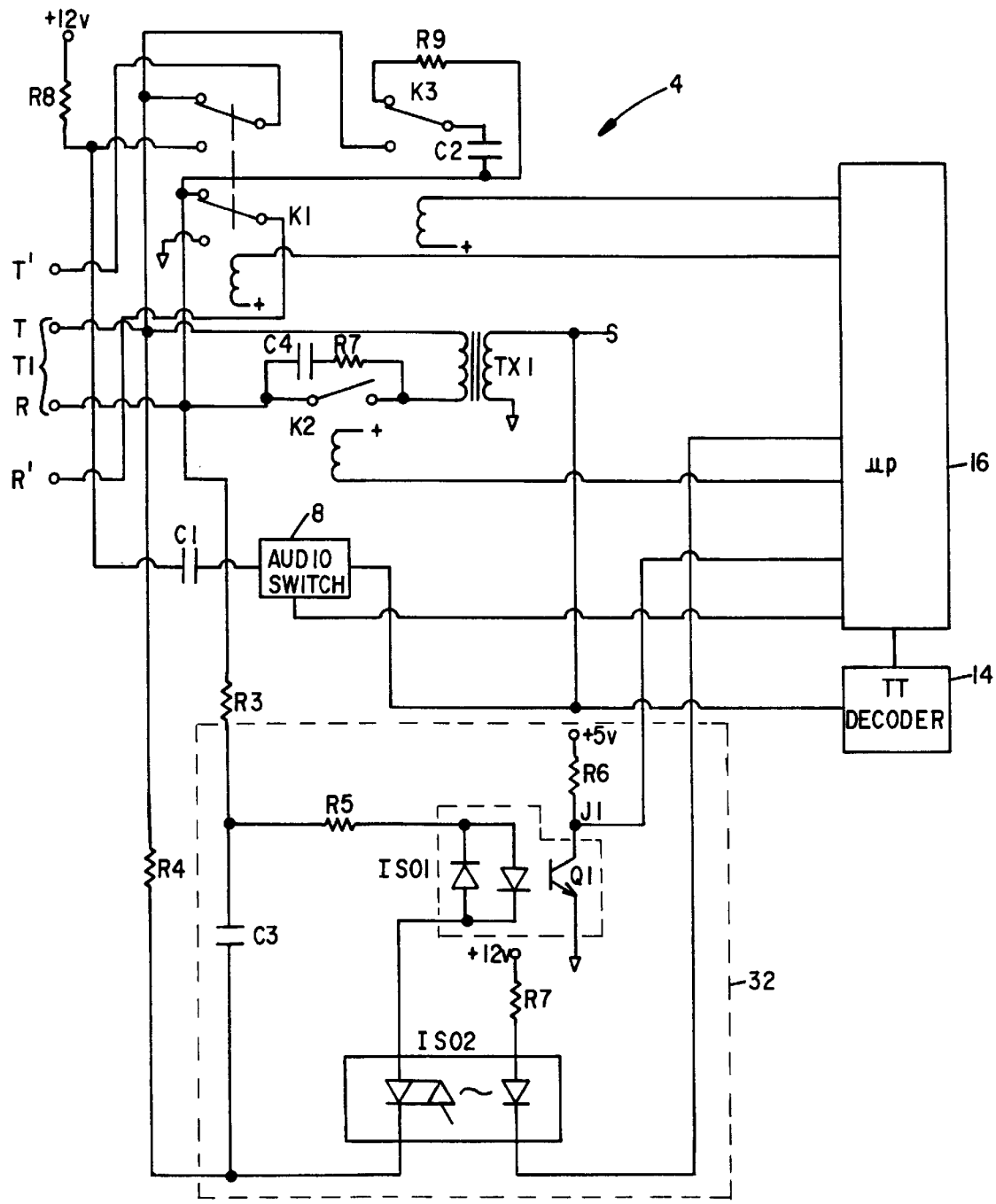
FIG. 2 is a circuit diagram showing the system controller and line monitor and relay circuitry which cooperate with the line seizure or "blocker" circuits.
Figure 3:
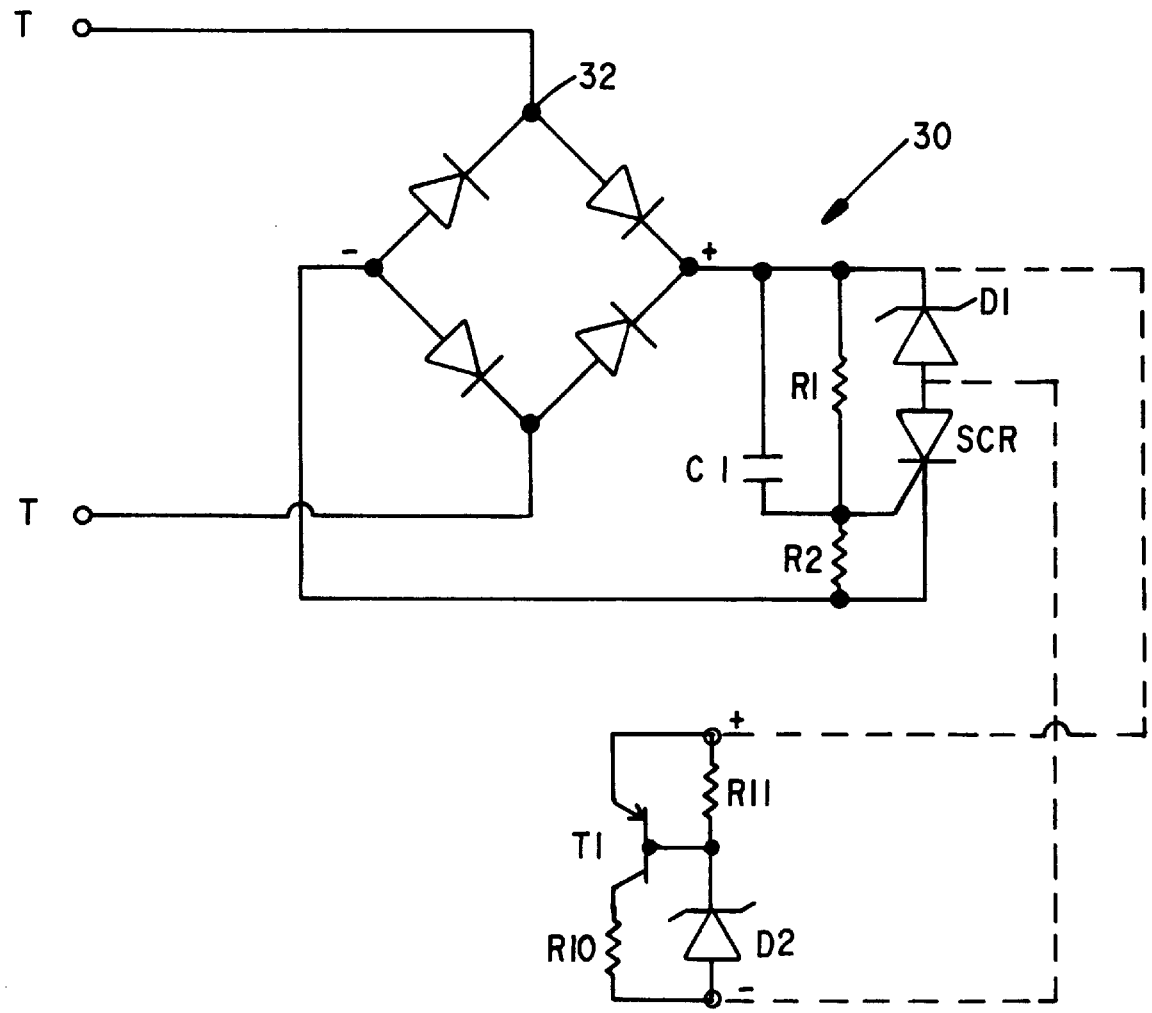
FIG. 3 is a schematic diagram showing the telephone line seizure or "blocker" circuit and wherein the dashed line current limiting portion may be added as desired.

Turning attention to FIGS. 2 and 3, a schematic diagram is shown to the system controller 4 and the relays K1, K2 and K3 and detection circuitry 32 of the line monitoring circuitry 12 which as necessary initiates the capturing of the telephone line T1. FIG. 3 shows a schematic diagram to one of the line seizure or "blocker" circuits LS1-LS"N", denoted as 30. The circuitry of FIGS. 2 and 3 cooperate to capture the telephone line T1 in the event the line T1 is off hook when an alarm is received that must be reported immediately. The system controller 4 is thereby able to communicate with the central station or establish a communication link to some other off-premises facilities.

With attention first directed to FIG. 3, the line seizure circuit 30 generally consists of a bridge rectifier 32 and a series connected SCR and zener diode D1. The rectifier 32 is connected in series with the tip wires "T" of the telephone line T1. A separate seizure circuit 30 is connected in series with each premise telephone P2 to PN.

In normal circumstances, each line seizure circuit 30 does not interfere with telephone operation, since each circuit 30 creates a short when its associated telephone is off hook. A short circuit is created each time a premises telephone is taken off hook and during ring signals when a corresponding voltage change across the T inputs triggers the SCR into conduction. Once the SCR is triggered, which acts like a switch, a maintenance current is supplied from the telephone line T1, due to the zener diode D1 and resistor R1, to sustain SCR conduction so that all off hook telephones can be used in normal fashion.

On occasion, SCR conduction may be disrupted, with a consequent loss of the connection at an off hook telephone, if more than one of the telephones P2 to PN are simultaneously off hook. To prevent this condition, current limiting circuitry, reference the dashed line portion of FIG. 3, can be added to the line seizure circuit 30 in lieu of the zener diode D1. The current limiting circuitry prevents the loss of the sustaining trigger current to the SCR by minimizing the initial off hook current when a telephone handset is taken off hook.

Returning attention to FIG. 2, when an alarm event occurs (e.g. emergency, fire, intrusion, AC power failure etc.), the system controller 4 determines if any premises telephones are off hook. If all telephones are on hook, the microprocessor 16 enables the coil at the dial relay K2 and the contacts of which are coupled to capture the line T1 and initiates a call sequence. If one or more premise telephones P2 to PN are off hook, the microprocessor 16 briefly enables the coil at the seizure relay K3 and the contacts of which are coupled to place the capacitor C2 across the telephone line T1. A momentary short circuit condition is created which essentially directs current flow away from the SCR's of any conducting line seizure circuit 30 and which after approximately 0.2 second are no longer able to conduct. The capacitor C2 is then removed from the line T1. The charge time of the capacitor C1 across each SCR gate, however, is set such that the SCR is not able to re-ignite for approximately 0.1 second and during which interval the line monitor 2 continues to monitor the line T1. With a confirmation by the line monitor 12 that all premises telephones are in an on hook condition, the microprocessor 16 enables the dial relay K2, captures the line T1, and initiates communications. If an off hook condition continues at any of the premises telephones, for example, because another premise telephone had been placed off hook or an SCR was not interrupted, the microprocessor 16 re-enables the seizure relay K3 until the telephone line T1 is captured.

The dial relay K2 contacts are shunted by resistor R7 and capacitor C4 and which provide a quench circuit for the relay contacts and an AC audio path around the K2 relay when the contacts are open. This allows the touch tone decoder 14 to monitor the telephone line T1 for touch tone signals and dial tone without being in an "off hook" condition.

When the system controller 4 captures the line T1, the on hook premises telephones are simultaneously disabled by establishing a relatively low resistance across the system controller 4 via a coupling transformer TX1 (i.e. 50 ohms). A low line voltage condition of 1 to 3 volts is established which further prevents the line seizure circuits 30 from re-igniting, until the system controller 4 hangs up. That is, the line voltage is insufficient to support the breakdown voltage of diode D1 and the additional voltage necessary to trigger the SCR at each line seizure circuit 30. Each premises telephone P2 to PN is thereby effectively isolated and unable to gain access to the telephone line T1. The isolation of each line seizure circuit 30 also minimizes any signal transfer to the telephone line T1 from any non line powered telephones.

The telephone line monitoring circuitry 12 is capable of determining the telephone line status conditions of "on hook", "off hook", and telephone line open or shorted (i.e. incapacitated). The line monitor 12 monitors the voltage across the telephone line T1 through resistors R3 and R4 (e.g. 4.7 Meg ohm each). The resistors R3 and R4 also provide load isolation for the telephone line T1 from the line detection circuit 32. Depending upon the voltage at telephone line T1 (e.g. >35 volts, if on hook versus 5–35 volts, if off hook), the detection circuit 32 produces a switched (i.e. yes/no) output in response to a pulsed input from the microprocessor 16. The presence or lack of an output during a period determined by the microprocessor 16 is used to enable either the dial or seizure relays K2 or K3.

The detection circuit 32 generally consists of the combination of an optically isolated pulse current detector ISO 1 and an optically isolated triac ISO 2, which is capable of being triggered at any time. During normal operation, the microprocessor 16 sends a trigger signal to ISO 2 at predetermined intervals (e.g. once every 2 sec). Depending upon the condition of the telephone line T1, the time interval necessary to allow capacitor C3 to charge and trigger ISO 1 to create a negative pulsed output at the junction J1 between Q1 and R6 varies. The charge time required when the telephone on the line T1 is "on hook" (e.g. 0.1 sec) is substantially less that that required when the telephone is "off hook" (e.g. 0.4 sec).

If the telephone line T1 is shorted or open (i.e. non-operational), no pulse is produced at the junction J1 under any condition. In this event, the system controller 4 alerts the system owner through an appropriate annunciation (e.g. siren or light). The system controller 4 also places itself in a condition which allows the owner to re-program the system controller 4 (e.g. turn the controller off or change the protection status) by using any of the telephone handsets that is directly coupled to the panel 4. In particular, 12 volts is connected to any telephone connected to the system controller 4 at the T' and R' inputs via the relay K1. For the system shown at FIG. 1, the telephone P1 is coupled to the 12 power supply of the system controller 4 through a limiting resistor R8. The telephone P1 can then be used to re-program the controller 4 as desired.

While the invention has been described with respect to a preferred construction, still other constructions may be suggested to those skilled in the art. The foregoing description should be construed to include all those embodiments within the spirit and scope of the following claims.

What is claimed is:

1. Telephone line seizure apparatus for a security alarm system including a system controller that is responsive to alarm signals from a plurality of distributed sensors, comprising:
   a) a telephone line having two conductors;
   b) a first handset coupled in parallel to the two conductors;
   c) a blocker circuit serially coupled to one conductor of said telephone line between said telephone line and the first handset for maintaining a short circuit condition and connection of the first handset to the telephone line in response to a ring signal or an off hook condition at the first handset; and
   d) a line monitoring circuit for monitoring the condition of said telephone line and responsive to a signal from said system controller for short circuiting said telephone line and causing said blocker circuit to revert to an open circuit condition, whereby the first handset is disconnected and the system controller can seize said telephone line and initiate telephone communications, said line monitoring circuit comprising a plurality of relays coupled to respond to control signals from a microprocessor of said system controller wherein:
      i) a first relay couples a capacitor across the two conductors of the telephone line for a predetermined period of time; and
      ii) a second relay couples an isolation device for isolation and preventing the first handset from capturing the telephone line when the system controller is connected thereto.

2. Telephone line seizure apparatus as set forth in claim 1 wherein said line monitoring circuit includes a telephone line seizing subcircuit for seizing the telephone line and for isolating the first handset from the telephone line when said system controller is connected thereto.

3. Telephone line seizure apparatus as set forth in claim 1 wherein said line monitoring circuit includes a subcircuit responsive to a non-operational telephone line condition for coupling a second handset to the system controller, whereby the system controller can be re-programmed.

4. Telephone line seizure apparatus as set forth in claim 1 where in said blocker circuit comprises:
   a) a rectifier coupled to the one line of said telephone line; and
   b) a switch including an SCR coupled to said rectifier for triggering and maintaining the conduction of the SCR during a ring signal or an off hook condition at the first handset.

5. Telephone line seizure apparatus as set forth in claim 4 where in said switch includes electrical capacitance responsive to the open circuit condition created by said line monitoring circuit for preventing the SCR from conducting for a period sufficiently long to permit the line monitoring circuit to seize the telephone line.

6. Telephone line seizure apparatus as set forth in claim 1 wherein said line monitoring circuit includes a subcircuit responsive to a non-operating telephone line condition for coupling a second handset to the system controller and wherein said line monitoring circuit includes a third relay that responds to said control signals and couples a voltage source to said second handset, whereby the second handset can re-program the system controller.

7. Telephone line seizure apparatus as set forth in claim 1 including a plurality of telephone handsets and a plurality of blocker circuits, wherein one of said blocker circuits is coupled to the telephone line between each of said plurality of telephone handsets, and wherein each of said blocker circuits comprises:
   a) a rectifier coupled to one conductor of the telephone line; and
   b) a switch coupled to said rectifier and comprising a voltage divider coupled in parallel to a series connected current control element and SCR, and including a capacitor coupled in parallel to a portion of said voltage divider and wherein a time delay is established to maintain the open circuit condition created by said line monitoring circuit sufficiently long to permit the line monitoring circuit to ensure that all of the plurality of telephone handsets are in an on hook condition, prior to seizing the telephone line.

8. Telephone line seizure apparatus as set forth in claim 7 wherein said line monitoring circuit comprises a plurality of relays coupled to respond to control signals from a microprocessor of said system controller and wherein;
   a) a first relay couples a capacitor across the two conductors of the telephone line for a predetermined period of time; and
   b) a second relay couples a isolation device for isolating and preventing the first handset from capturing the telephone line when the system controller is connected thereto.

9. Telephone line seizure apparatus as set forth in claim 8 wherein said line monitoring circuit includes a subcircuit responsive to a non-operating telephone line condition for coupling a second handset to the system controller and wherein said line monitoring circuit includes a third relay that responds to said control signals and couples a voltage source to said second handset, whereby the second handset can re-program the system controller.

10. Telephone line seizure apparatus for a telephone system including a system controller, comprising:
   a) a telephone line having two conductors;
   b) a plurality of telephone handsets coupled in parallel to the two conductors;
   c) a plurality of blocker circuits each comprising a rectifier coupled to one conductor of said telephone line and a switch coupled to said rectifier by a voltage divider coupled in parallel to a series connected current control element and SCR and including a capacitor coupled in parallel to a portion of said voltage divider for establishing a time delay, each of the blocker circuits serially coupled to the one conductor of said telephone line between the telephone line and an associated handset for maintaining a short circuit condition and connection of the associated handset to the telephone line in response to a ring signal or an off hook condition at the associated handset; and
   d) a line monitoring circuit for monitoring the condition of said telephone line and responsive to a control signal from said system controller for short circuiting said telephone line and causing said blocker circuits to revert to an open circuit condition for a time sufficiently long to permit the line monitoring circuit to ensure that all of the telephone handsets are in an on hook condition, prior to the line monitoring circuit seizing the telephone line and isolating each of the telephone handsets therefrom, whereby the handsets are disconnected and the system controller can seize said telephone line and initiate telephone communications.

11. Telephone line seizure apparatus as set forth in claim 10 wherein said line monitoring circuit comprises a plurality of relays coupled to respond to control signals from a microprocessor of said system controller and wherein;
   a) a first relay couples a capacitor across the two conductors of the telephone line for a predetermined period of time; and
   b) a second relay couples an isolator device for isolating and preventing the handsets from capturing the telephone line when the system controller is connected thereto.

12. Telephone line seizure apparatus as set forth in claim 11 wherein said line monitoring circuit includes a subcircuit responsive to a non-operating telephone line condition for coupling a dedicated handset to the system controller and wherein said line monitoring circuit includes a third relay that responds to said control signals and couples a voltage source to said dedicated handset, whereby the dedicated handset can re-program the system controller.

13. Telephone line seizure apparatus as set forth in claim 11 further including a dedicated telephone handset and wherein said line monitoring circuit further includes a third relay coupled to a dedicated telephone handset that responds to said control signals and couples a voltage source to said dedicated handset, whereby the second handset can re-program the system controller.

14. Telephone line seizure apparatus for a security alarm system including a system controller that is responsive to alarm signals from a plurality of distributed sensors, comprising:
   a) a telephone line having two conductors;
   b) a first handset coupled in parallel to the two conductors;
   c) a blocker circuit serially coupled to one conductor of said telephone line between said telephone line and the first handset for maintaining a short circuit condition and connection of the first handset to the telephone line in response to a ring signal or an off hook condition at the first handset; and
   d) a line monitoring circuit for monitoring the condition of said telephone line and responsive to an alarm reported to said system controller for short circuiting said telephone line and causing said blocker circuit to revert to an open circuit condition such that the first handset is disconnected and the system controller can seize said telephone line and initiate telephone communications, the line monitoring circuit further including a subcircuit responsive to a non-operational telephone line condition for coupling a second handset to the system controller, whereby the system controller can be re-programmed.

15. Telephone line seizure apparatus as set forth in claim 14 wherein said line monitoring circuit includes a subcircit for seizing the telephone line and for isolating the first handset from the telephone line when said system controller is connected thereto.

16. Telephone line seizure apparatus as set forth in claim 14 where in said blocker circuit comprises:

a) a rectifier coupled to the one line of said telephone line; and b) a switch including an SCR coupled to said rectifier for triggering and maintaining the conduction of the SCR during a ring signal or an off hook condition at the first handset.

17. Telephone line seizure apparatus as set forth in claim 16 where in said switch includes an electrical capacitance responsive to the open circuit condition created by said line monitoring circuit for preventing the SCR from conducting for a period sufficiently long to permit the line monitoring circuit to seize the telephone line.

18. Telephone line seizure apparatus as set forth in claim 14 where in said line monitoring circuit comprises a plurality of relays coupled to respond to control signals from a microprocessor of said system controller and wherein:

a) a first relay couples a capacitor across the two conductors of the telephone line for a predetermined period of time; and b) a second relay couples a subcircuit for isolating and preventing the first handset from capturing the telephone line when the system controller is connected thereto.

19. Telephone line seizure apparatus as set forth in claim 14 including a plurality of telephone handsets and a plurality of blocker circuits, wherein one of said blocker circuits is coupled to the telephone line between each of said plurality of telephone handsets, and wherein each of said blocker circuits comprises:

a) a rectifier coupled to one conductor of the telephone line; and b) a switch coupled to said rectifier and comprising a voltage divider coupled in parallel to a series connected current control element and SCR and including a capacitor coupled in parallel to a portion of said voltage divider and wherein a time delay is established to maintain the open circuit condition created by said line monitoring circuit sufficiently lone to permit the line monitoring circuit to ensure that all of the plurality of telephone handsets are in an on hook condition, prior to seizing the telephone line.

20. Telephone line seizure apparatus as set forth in claim 19 wherein said line monitoring circuit comprises a plurality of relays coupled to respond to control signals from a microprocessor of said system controller and wherein:

a) a first relay couples a capacitor across the two conductors of the telephone line for a predetermined period of time; and b) a second relay couples a subcircuit for isolating and preventing the first handset from capturing the telephone line when the system controller is connected thereto.

* * * * *